US010237253B2

(12) United States Patent
Chen

(10) Patent No.: US 10,237,253 B2
(45) Date of Patent: *Mar. 19, 2019

(54) PRIVATE CLOUD ROUTING SERVER, PRIVATE NETWORK SERVICE AND SMART DEVICE CLIENT ARCHITECTURE WITHOUT UTILIZING A PUBLIC CLOUD BASED ROUTING SERVER

(71) Applicant: Kingston Digital, Inc., Fountain Valley, CA (US)

(72) Inventor: Ben Wei Chen, Fountain Valley, CA (US)

(73) Assignee: Kingston Digital, Inc., Fountain Valley, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/450,104

(22) Filed: Aug. 1, 2014

(65) Prior Publication Data

US 2014/0359704 A1  Dec. 4, 2014

Related U.S. Application Data

(63) Continuation-in-part of application No. 13/229,285, filed on Sep. 9, 2011.

(51) Int. Cl.
*H04L 29/06* (2006.01)
*H04L 29/08* (2006.01)

(52) U.S. Cl.
CPC .......... *H04L 63/08* (2013.01); *H04L 63/029* (2013.01); *H04L 63/0272* (2013.01);
(Continued)

(58) Field of Classification Search
CPC ......... H04L 29/08306; H04L 29/06319; H04L 29/06326; H04L 29/06333;
(Continued)

(56) References Cited

U.S. PATENT DOCUMENTS 5,408,618 A  4/1995 Aho et al.
6,438,594 B1  8/2002 Bowman-Amuah
(Continued)

FOREIGN PATENT DOCUMENTS

GB        2341523       3/2000
WO   WO 2011/133908   10/2011

OTHER PUBLICATIONS

Craig Ellison, "Iomega Home Media Network Hard Drive—Cloud Edition Reviewed", Mar. 2011, Applicant's admitted prior art of App.No. 13229285.*

(Continued)

*Primary Examiner* — Chau Le
(74) *Attorney, Agent, or Firm* — Brundidge & Stanger, P.C.

(57) ABSTRACT

A method and system for use with a public cloud network is disclosed, wherein the public cloud network includes at least one private cloud routing server, at least one private network service and at least one smart device client in communication therewith. The method and system comprise setting up the at least one private cloud routing server, the at least one private network service and the at least one smart device client in a client server relationship. The at least one private cloud routing server includes a message box associated therewith. The first message box is located in the public network. The at least one smart client includes a second message box associated therewith. The second message box is located on the public network. The method includes passing session based message information between the at least one private cloud routing server and the at least one smart device client via the first message box and the second message box in a secure manner. The session based information is authenticated by the private cloud routing server and the at least one smart device client. The smart device client and the private cloud routing server can then com- (Continued)

municate with each other after the session based information is authenticated. The at least one private network service is then manageable and accessible by the at least one smart device client from anywhere at anytime without utilizing a public cloud based routing server.

11 Claims, 11 Drawing Sheets

(52) U.S. Cl.
CPC ............ *H04L 63/10* (2013.01); *H04L 63/101* (2013.01); *H04L 67/1097* (2013.01)
(58) Field of Classification Search
CPC ......... H04L 29/08144; H04L 29/12009; H04L 63/08; H04L 63/10; H04L 63/0272; H04L 63/029; H04L 63/101; H04L 67/1097; G06F 17/30206; G06F 17/30209
See application file for complete search history.

(56) References Cited

U.S. PATENT DOCUMENTS

| | | | |
|---|---|---|---|
| 6,563,515 B1 | 5/2003 | Reynolds et al. | |
| 6,779,004 B1 | 8/2004 | Zintel | |
| 6,954,790 B2 | 10/2005 | Forslow | |
| 6,978,314 B2 | 12/2005 | Tarr | |
| 6,981,041 B2 | 12/2005 | Araujo et al. | |
| 7,068,680 B1 | 6/2006 | Kaltenmark et al. | |
| 7,120,429 B2 | 10/2006 | Minear et al. | |
| 7,219,140 B2 | 5/2007 | Marl et al. | |
| 7,293,077 B1 | 11/2007 | Teo et al. | |
| 7,328,256 B2 | 2/2008 | Taoyama et al. | |
| 7,392,034 B2 | 6/2008 | Westman et al. | |
| 7,408,882 B2 | 8/2008 | Abdo et al. | |
| 7,467,198 B2 | 12/2008 | Goodman et al. | |
| 7,487,230 B2 | 2/2009 | Gu et al. | |
| 7,558,846 B2 | 7/2009 | Gu et al. | |
| 7,562,393 B2 | 7/2009 | Buddhikot et al. | |
| 7,602,756 B2 | 10/2009 | Gu et al. | |
| 7,627,653 B2 | 12/2009 | Taoyama et al. | |
| 7,630,341 B2 | 12/2009 | Buddhikot et al. | |
| 7,636,764 B1 | 12/2009 | Fein et al. | |
| 7,640,340 B1 | 12/2009 | Stapp et al. | |
| 7,640,546 B2 | 12/2009 | Zarenin et al. | |
| 7,647,203 B1 | 1/2010 | Herz | |
| 7,676,690 B2 | 3/2010 | Bucher et al. | |
| 7,788,656 B2 | 8/2010 | Harper | |
| 7,810,148 B2 | 10/2010 | Bed-Shacher et al. | |
| 7,978,714 B2 | 7/2011 | Rao et al. | |
| 8,045,000 B2 | 10/2011 | Davidson et al. | |
| 8,069,217 B2 | 11/2011 | Lo et al. | |
| 8,170,209 B2 | 5/2012 | Peng et al. | |
| 8,300,056 B2 | 10/2012 | Nugent et al. | |
| 8,412,798 B1 | 4/2013 | Wang | |
| 9,729,625 B1* | 8/2017 | Davidson ............ H04L 63/0428 | |
| 9,781,087 B2* | 10/2017 | Chen ........................ H04L 63/08 | |
| 9,935,930 B2* | 4/2018 | Chen ........................ H04L 63/08 | |
| 2002/0147810 A1* | 10/2002 | Traversat .............. G06F 9/4416 709/224 |
| 2004/0223469 A1 | 11/2004 | Bahl et al. | |
| 2005/0286476 A1 | 12/2005 | Crosswy et al. | |
| 2006/0271968 A1 | 11/2006 | Zellner | |
| 2006/0291434 A1 | 12/2006 | Gu et al. | |
| 2007/0165579 A1 | 7/2007 | Delibie et al. | |
| 2007/0294368 A1 | 12/2007 | Bomgaars et al. | |
| 2008/0016491 A1 | 1/2008 | Doepke | |
| 2008/0019333 A1 | 1/2008 | Kharia et al. | |
| 2008/0162698 A1 | 7/2008 | Hopen et al. | |
| 2008/0201751 A1 | 8/2008 | Ahmed et al. | |
| 2008/0301794 A1 | 12/2008 | Lee | |
| 2009/0019492 A1 | 1/2009 | Grasset | |
| 2009/0106394 A1 | 4/2009 | Lin et al. | |
| 2009/0129301 A1 | 5/2009 | Belimpasakis | |
| 2009/0303973 A1 | 12/2009 | Patil | |
| 2010/0036955 A1 | 2/2010 | Hopen et al. | |
| 2010/0188987 A1 | 7/2010 | Azimi et al. | |
| 2010/0205309 A1* | 8/2010 | Skog ................... H04L 12/2818 709/227 |
| 2011/0107379 A1 | 5/2011 | Lajoie et al. | |
| 2011/0145418 A1 | 6/2011 | Pratt et al. | |
| 2011/0145821 A1 | 6/2011 | Philipson et al. | |
| 2012/0084798 A1 | 4/2012 | Reeves et al. | |
| 2012/0081382 A1 | 8/2012 | Lindahl et al. | |
| 2012/0236796 A1* | 9/2012 | Lazaridis .......... H04L 29/12301 370/328 |
| 2012/0307141 A1 | 12/2012 | Millet et al. | |
| 2012/0311329 A1* | 12/2012 | Medina ................. H04L 12/581 713/168 |
| 2013/0024545 A1 | 1/2013 | Sheppard et al. | |
| 2013/0067550 A1 | 3/2013 | Chen et al. | |
| 2013/0177891 A1 | 7/2013 | Hammerschmidt | |
| 2013/0231146 A1* | 9/2013 | Mathias .............. H04M 7/0057 455/466 |
| 2014/0141721 A1 | 5/2014 | Kim et al. | |
| 2014/0306865 A1 | 10/2014 | Pan et al. | |
| 2014/0359477 A1 | 12/2014 | Chen | |
| 2014/0372517 A1* | 12/2014 | Zuili ................... H04N 21/4788 709/203 |
| 2015/0327313 A1 | 11/2015 | Kim et al. | |

OTHER PUBLICATIONS

Craig Ellison, "Iomega Home Media Network Hard Drive—Cloud Edition Reviewed", Applicant's admitted prior art of App.No. 13229285.*
Guy McDowell, "How Does a Router Work", Oct. 2009, http://www.makeuseof.com/tag/technology-explained-how-does-a-router-work/.*
Ellison, Craig (Mar. 29, 2011) "Iomega Home Media Network Hard Drive—Cloud Edition Reviewed" SmallCloudBuilder.com http://www.smallcloudbuilder.com/storage/reviews/311-iomega-home-media-network-hard-drive-cloud-edition-reviewed.
Malik, Om (May 22, 2009) "How Pogoplug W orks" gigaom.com http://gigaom.com/2009/05/22/how-pogoplug-works/.
Mldonkey (Oct. 5, 2010) "W hatFirewallPortsToOpen" mldonkey.sourceforge.net http://mldonkey.sourceforge.net/WhatFirewallPortsToOpen.
McDowell, Guy "How Does a Router Work", Oct. 2009, http://www.makeuseof.com/tag/technology-explained-how-does-a-router-work/.
Liu, Rue "Iomega Home Media Hard Drive Cloud Edition Review—SlashGear", Jun. 2011, SlashGear, http://www.slashgear.com/iomega-home-media-hard-drive-cloud-edition-review-14156840/.
Use Yahoo Messenger for a Video or Audio Conference, Mar. 2005, http://education.ucf.edu/techfac/docs/videochattutorial.pdf.
Filename "2012 Sep WiFi-Miracast brochure.pdf" Miracast-paper: "Wi-Fi Certified MiracastTM: Extending the Wi-Fi experience to seamless video display" published by Wi-Fi Alliance on Sep. 19, 2012.
Filename: "WiFi Miracast Demo video—Screenshots and Transcript.pdf" Screenshots and Transcripts of "Wi-Fi Certified MiracastTM Demo at 2013 CES" video https://www.youtube.com/watch?v=cYagdOp9y7E published by Wi-Fi Alliance on Jan. 9, 2013.
Filename: "2011-July Samsung Remote App.pdf" Samsung App Profile: Remote App published published online on Jul. 30, 2011.
Filename: "2013-Mar panasonic-my-home-screen-smart-tv.pdf" "Panasonic My Home Screen Smart TV Interface" published online on Mar 6, 2013.
Filename: "2012-Jul samsung-tv-remote-app" "Samsung TV Remote app not working for some 2012" online article published on Jul. 18, 2012.

* cited by examiner

PRIVATE CLOUD ROUTING SERVER, PRIVATE NETWORK SERVICE AND SMART DEVICE CLIENT ARCHITECTURE WITHOUT UTILIZING A PUBLIC CLOUD BASED ROUTING SERVER

CROSS-REFERENCE TO RELATED APPLICATION

This application is a continuation-in-part of U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," which is incorporated herein by reference in its entirety.

FIELD OF THE INVENTION

The present invention relates generally to networking and more particularly to the use of private cloud networks.

BACKGROUND OF THE INVENTION

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and any place to retrieve services from one or many serving parties or servers. The services include audio, video contents, live or archived information, and execution of applications, social media, messaging, email, storage, backup, calendar, contact, synchronization and others. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server is a private cloud storage server (PCSS). The PCSS sits within the local area network (LAN) managed by the user. It provides on-line and backup storage for the user either within the LAN or in the wide area network (WAN). The user is able to use a Smart Device Client to access information within the private cloud storage server at anytime from anywhere. The private cloud storage server and the associated Smart Device Client therefore form an example of the Private Cloud Server and Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed IP address and open certain ports for the router in front of the PCSS, such that the Smart Device Client is able to locate the PCSS from outside the LAN and to authenticate itself, penetrate the firewall and establish a secure communication channel with the PCSS.

The second solution applies when a fixed IP address is not available. The user configures the LAN router of the PCSS and opens certain ports to map to the PCSS. The router is therefore able to be located by the intended Smart Device Client through a dynamic DNS (DDNS) service on the WAN. The Smart Device Client can authenticate itself, penetrate the firewall and establish a secure communication channel with the PCSS.

The third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

The fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix- and match of the above mentioned solutions.

In the first scenario, a fixed IP address is required and the router needs to be set up and configured. The down side is that a fixed IP involves more cost and is usually not available in the home and small business environment. The router set up and configuration can be very complicated and are not user friendly with most consumers.

In the second scenario, a DDNS service is required and the router needs yet more complex set up. Again, the DDNS set up involves additional cost and complexity into the system. The router set up and configuration can be very complicated and is not user friendly with most consumers.

In the third and fourth scenarios, an outside routing server or service needs to be established, while a router set up is not necessary. The outside routing server or service controls and handles login/authentication between the Smart Device Client and the server. The private cloud becomes less private and less secure through the public cloud based server or service. If for any reason the server or service is down, the communication and availability of the private cloud storage server will be jeopardized.

All of these scenarios require technical expertise that may be suitable for conventional corporate environment, but these scenarios are not suitable for consumer oriented Smart Device Client centric deployment.

In most conventional systems, an outside or public cloud based routing server is used by the Smart Device Client during access to the Private Cloud Server. Using an outside server creates a number of concerns to the Smart Device Client owner.

First, the sense of trust is always in question, because the outside or public cloud based routing server is a middleman during all communication transactions between the Smart Device Client and the Private Cloud Server. It may hold all user account info, password and their corresponding IP addresses of the Smart Device Client and the Private Cloud Server. The routing server is able to sniff any communication in-between and render it insecure.

Second, being an outside and public cloud based routing server, its business model may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Accordingly, what is needed is a system and method that addresses the above identified issues. The present invention addresses such a need.

SUMMARY OF THE INVENTION

A method and system for use with a public cloud network is disclosed, wherein the public cloud network includes at least one private cloud routing server, at least one private network service and at least one smart device client in communication therewith. The method and system comprise setting up the at least one private cloud routing server, the at least one private network service and the at least one smart device client in a client server relationship. The at least one private cloud routing server includes a message box associated therewith. The first message box is located in the public network. The at least one smart client includes a second message box associated therewith. The second message box is located on the public network.

The method includes passing session based message information between the at least one private cloud routing server and the at least one smart device client via the first message box and the second message box in a secure manner. The session based information is authenticated by the private cloud routing server and the at least one smart device client. The smart device client and the private cloud routing server can then communicate with each other after the session based information is authenticated. The at least one private network service is then manageable and accessible by the at least one smart device client from anywhere at anytime without utilizing a public cloud based routing server.

DETAILED DESCRIPTION

Figure 1A:
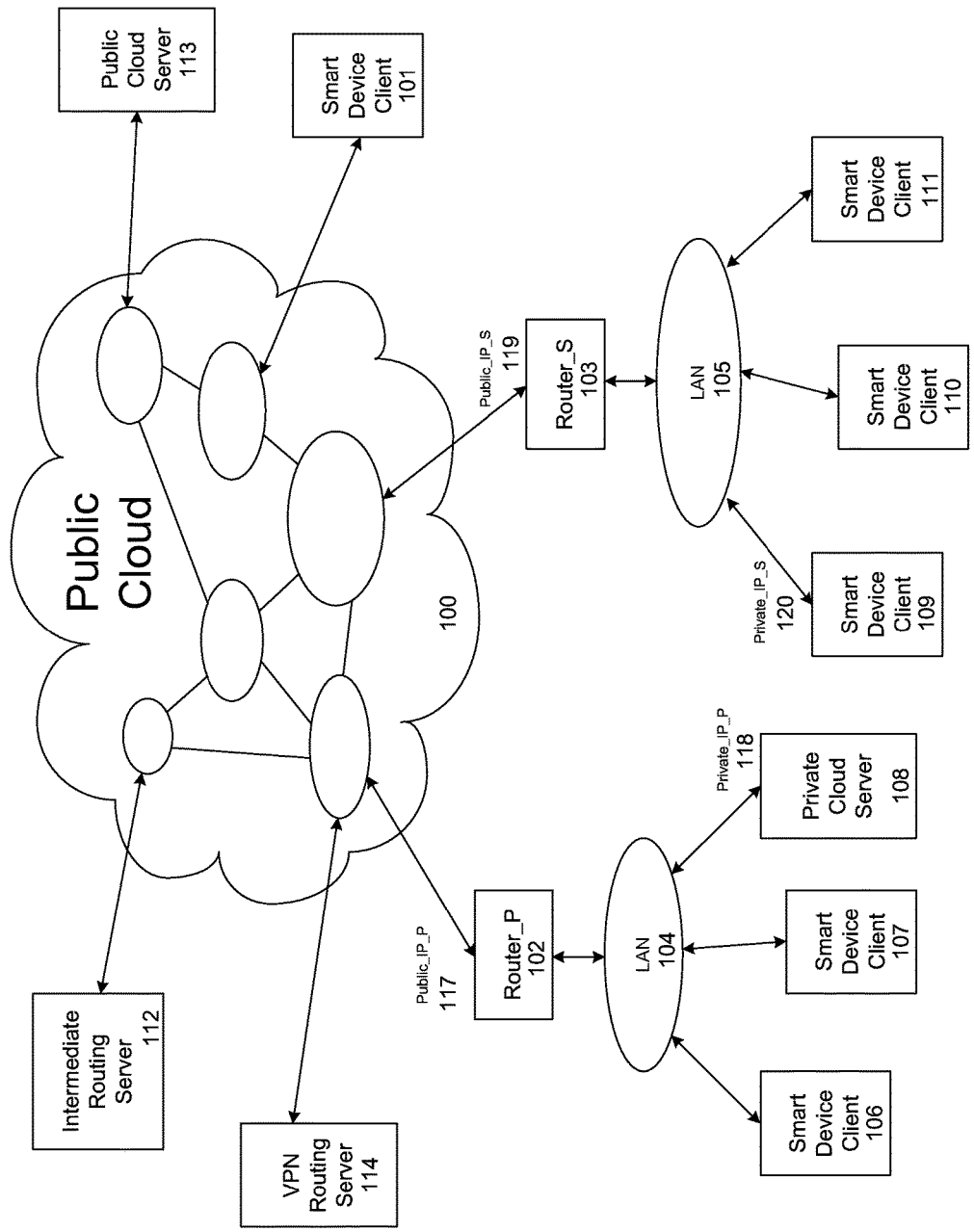
FIG. 1A is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer oriented environment for a Smart Device Client in a WAN to be able to obtain services from a Private Cloud Storage Server (PCSS) or any Private Cloud Server (PCS):

1. Access the Private Cloud Server (PCS) at anytime from anywhere.

2. Access the PCS behind the firewall with fixed or dynamic IP address.

3. Require no outside or public cloud based routing server in the WAN.

4. Require no additional router setup in the LAN.

5. Authenticate with the PCS.

6. Establish a secure communication channel with the PCS.

If such challenges can be met and resolved, it will increase the deployment of the Private Cloud Server or service exponentially, due to the plug and play simplicity and availability. It also removes the technical and business concern by not utilizing a public cloud based routing server. The Private Cloud Server covering storage, remote desktop service and Internet of Things (IoT) becomes very affordable and ubiquitous in the private cloud infrastructure.

In the private cloud environment, if there are more than one private cloud servers or services co-exist at the same time, it is advantageous to separate out the functions of Private Cloud Server into two functional blocks including Private Cloud Routing Service and Private Network Service. The Private Network Service (PNS) by itself is designed to be managed and accessed on the private network environment, be it wired or wireless, by the Smart Device Client. Examples of the Private Network Service include application program server to provide remote desktop protocol (RDP), VNC, office tools, media player, and other user specific applications. It may also function as a storage server that contains multiple terabytes of storage serving the private cloud. The Private Cloud Routing Service functions of the multiple Private Cloud Servers can then be aggregated together into just one Private Cloud Routing Server (PCRS). The Private Cloud Routing Server can generally be referred to as a Private Cloud Router.

A system and method in accordance with the present invention addresses the following challenges in the consumer oriented environment for utilizing the Smart Device Client in the WAN to be able to manage and access Private Network Service (PNS) from a Private Cloud Routing Server (PCRS):

1. Access the Private Cloud Routing Server (PCRS) at anytime from anywhere.
2. Access the PCRS behind the firewall with fixed or dynamic IP address.
3. Require no outside or public cloud based routing server in the WAN.
4. Require no additional router setup in the LAN.
5. Authenticate with the Private Cloud Routing Server (PCRS).
6. Establish a secure communication channel with the Private Network Service (PNS) to manage and access.

If the Private Cloud Routing Server (PCRS) can fulfill the above mentioned challenges, the heterogeneous Private Cloud Servers from different manufacturers and vendors can then be broken down into simpler Private Network Services and remove the complexity of private cloud setup, configuration and access The purpose of a system and method in accordance with the invention is to provide a Private Cloud Routing Server (PCRS), Private Network Service and Client architecture without utilizing a routing server. The system and method in accordance with the present invention addresses the above identified challenges that to allow a Client to be able to access the Private Network Service (PNS) from anywhere at anytime. The system and method also accesses the PNS behind a firewall with fixed or dynamic IP, requires no additional router setup and no public cloud based routing server in the WAN, to authenticate with the PCRS, and to establish a secure communication channel directly with the PNS.

As shown in FIG. 1A, a cloud network infrastructure includes a public cloud 100, a public cloud server 113, an intermediate routing server 112, a VPN routing server 114, a Smart Device Client 101 in the WAN, a Router_P 102 and a Router_S 103. The Router_S 103 connects between a LAN 105 and the Internet in public cloud 100. The Router_P 102 connects between a LAN 104 and the Internet in public cloud 100. Behind the LAN 104, there are Smart Device Clients 106, 107 and a Private Cloud Server (PCS) 108. Behind the LAN 105, there are Smart Device Clients 109, 110 and 111. The Smart Device Client can be a PC, notebook, tablet, eBook reader, GPS, smart TV, set top box, MP3 player, or any networkable embedded device.

They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the Private Cloud Server 108. First, a Smart Device Client 107 determines whether the target is in the locally accessible LAN 104 and decides to connect to the Private Cloud Server 108 directly. Second, the Smart Device Client 101 determines the target is not in the locally accessible LAN 104 and decides to connect through the WAN to the public cloud 100. The WAN locates the Router_P 102 and LAN 104, then connects to the Private Cloud Server 108. Third, the Smart Device Client 109 determines the target is not in the locally accessible LAN 105 and decides to passes through LAN 105, Router_S 103, and connects to the public cloud 100 in the WAN.

The Smart Device Client 109 then locates Router_P 102, LAN 104 and connects to the Private Cloud Server 108. The first and the second scenario are two special cases and derivatives of the third scenario. Therefore, it is beneficial to focus on the third scenario that is broader in scope and complexity.

Figure 2:
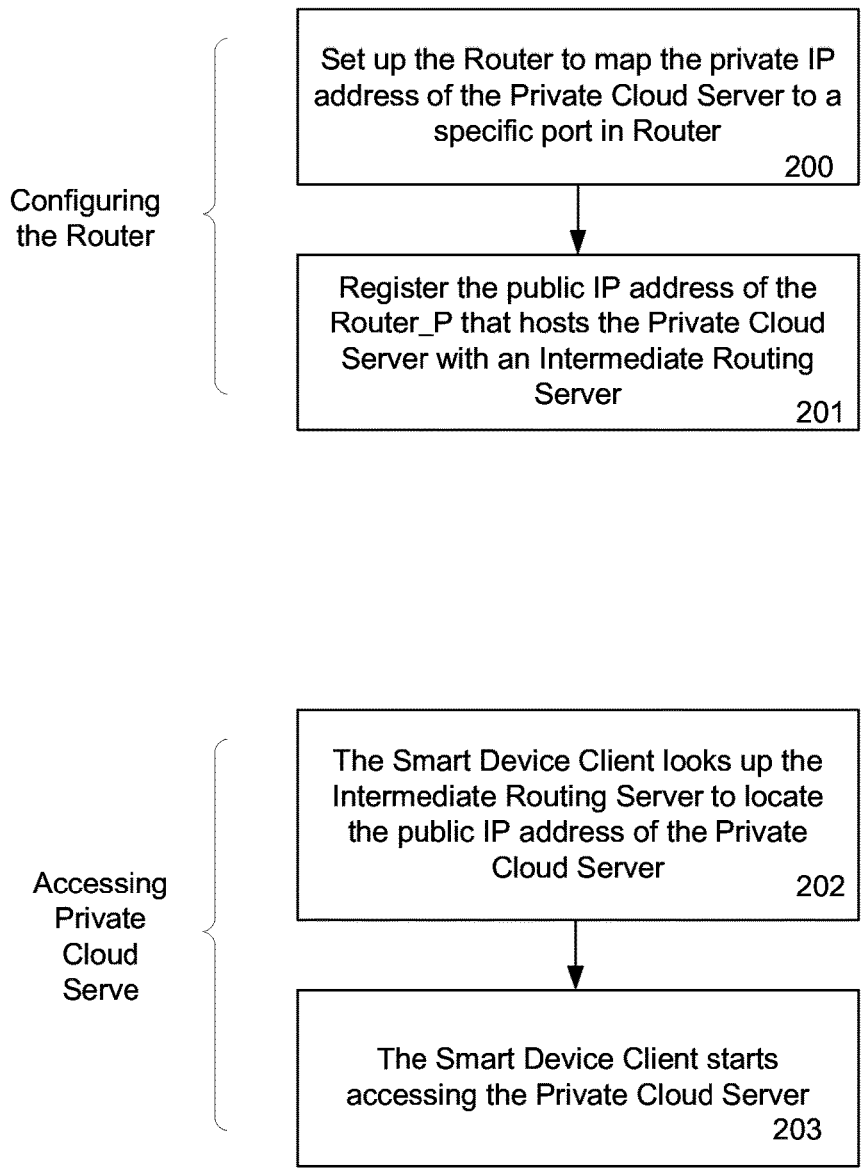
FIG. 2 shows a conventional implementation of how the Private Cloud Server can be accessed physically through the configuration of its Router_P on the LAN.

FIG. 2 shows a conventional implementation of how the Private Cloud Server 108 can be accessed physically through the configuration of its Router_P 102 on the LAN 104. There are two steps involved in configuring the Router_P 102. First, the user needs to map the private IP address of the Private Cloud Server 108, to a specific port in Router_P 102, as in step 200. Second, the user needs to register the public IP address of the Router_P 102 that hosts the Private Cloud Server 108, with an Intermediate Routing Server 112 in the WAN, as in step 201. Before the Smart Device Client 109 can access the Private Cloud Server 108, it looks up the Intermediate Routing Server 112 to locate the public IP address of the Private Cloud Server 108, as in step 202. It then can start accessing, as in step 203, the predetermined port of the Router_P 102, which is correctly mapped to the private IP address of the Private Cloud Server 108.

The configuration of the Router_P 102 and the setup of the Intermediate Routing Server 112 are not really trivial and can be very difficult for most of the end users. Further, by mapping the private IP address of the Private Cloud Server 108 to a port that is directly and permanently addressable by the outside world, it conceivably creates a big security risk for the Private Cloud Server 108.

The Private Cloud Server 108 is directly and permanently exposed to the outside world that can invite many vicious attacks. Also, the Intermediate Routing Server 112 is a public cloud based server. It creates a number of concerns to the Smart Device Client 109 owner. First, the sense of trust is always in question, because the Intermediate Routing Server 112 is a middleman during all communication transactions between the Smart Device Client 109 and the Private Cloud Server 108. It may hold all user account information, password and their corresponding IP addresses of the Smart Device Client 109 and the Private Cloud Server 108. The Intermediate Routing Server 112 is able to sniff any communication in-between and render it insecure.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

Figure 3:
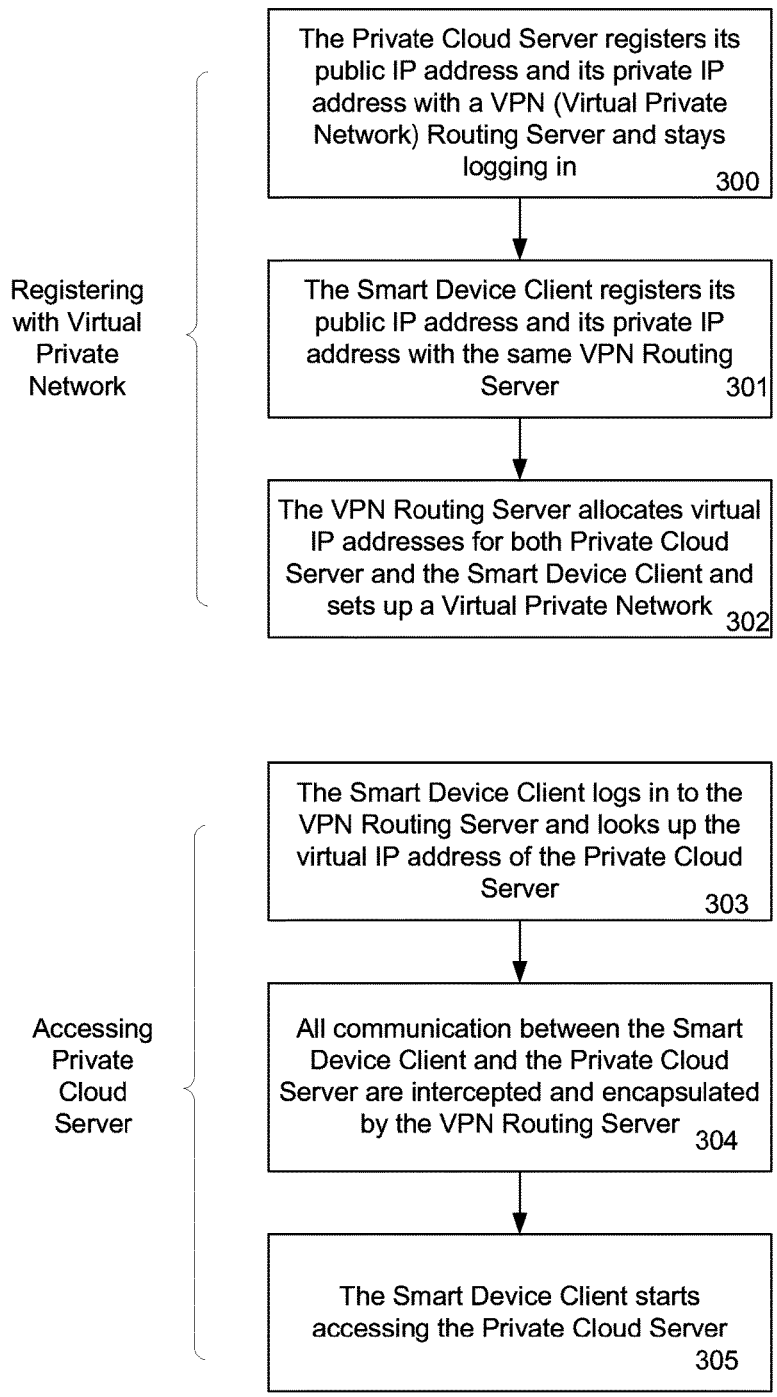
FIG. 3 shows a conventional implementation of how the Private Cloud Server can be accessed logically through registration with a VPN Routing Server.

FIG. 3 shows a conventional implementation of how the Private Cloud Server 108 can be accessed logically through registration with a VPN Routing Server 114. During setup of a virtual private network, the Private Cloud Server 108 first registers its public IP address and its private IP address with a VPN (virtual private network) Routing Server 114 and stays logging in, as in 300. The Smart Device Client 109 also registers its public IP address and its private IP address with the same VPN Routing Server 114, in step 301. The VPN Routing Server 114 allocates virtual IP addresses for both Private Cloud Server and the Smart Device Client 109 and sets up a Virtual Private Network 302. By this time, the Smart Device Client 109 and the Private Cloud Server 108 are in the same virtual IP domain under the control of the VPN Routing Server 114. All communication between the Smart Device Client 109 and the Private Cloud Server 108 are encapsulated under the VPN protocol.

The Smart Device Client 109 then logs in to the VPN Routing Server 114 and looks up the virtual IP address of the Private Cloud Server 108, in step 303. All communication between the Smart Device Client 109 and the Private Cloud Server 108 are intercepted and encapsulated by the VPN Routing Server 114, in step 304. The Smart Device Client 109 can then start accessing the Private Cloud Server 108, as in step 305.

As opposed to the approach disclosed in FIG. 2, the VPN Routing Server approach benefits by eliminating the router configuration. It therefore makes the setup much easier for the user. But it suffers the same, if not more serious business concerns on the issue of having to have all communication going through a public cloud based routing server. Being a public cloud based server, the VPN Routing Server 114 creates a number of concerns to the Smart Device Client 109 owner. First, the sense of trust is always in question, because the VPN Routing Server 114 is a middleman during all communication transactions between the Smart Device Client 109 and the Private Cloud Server 108. It may hold all user account information, password and their corresponding IP addresses of the Smart Device Client 109 and the Private Cloud Server 108. The VPN Routing Server 114 is able to sniff any communication in-between and render it insecure. Second, being an outside and public cloud based routing server, the business model of the VPN Routing Server 114 may not always be in-line or in-sync with the Smart Device Client 109 owner. If the VPN Routing Server 114 is out of service due to any business reason, there is no remedy or option of replacement to restore the service. Unless the user has total control over the VPN routing server, it potentially poses a tremendous business risk to the user, as the vital link in the communication can be broken without recourse.

Figure 4:
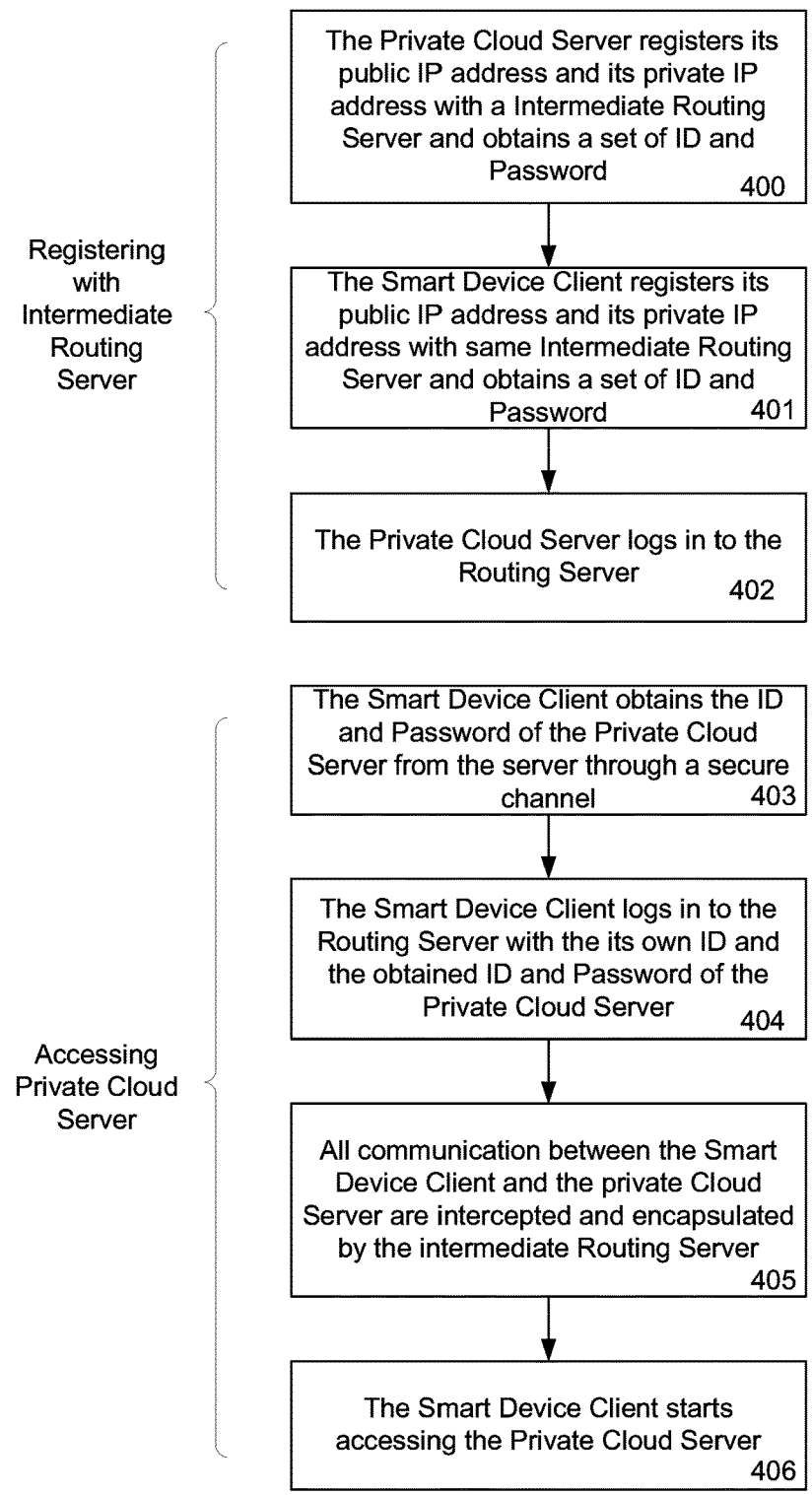
FIG. 4 shows an implementation of how the Private Cloud Server can be accessed logically through registration with an Intermediate Routing Server.

FIG. 4 shows an implementation of how the Private Cloud Server 108 can be accessed logically through registration with an Intermediate Routing Server 112. The Private Cloud Server 108 first registers its public IP address and its private IP address with an Intermediate Routing Server 112 and obtains a set of ID and Password from the server, in step 400. The Smart Device Client 109 then registers its public IP address and its private IP address with the same Intermediate Routing Server 112 and obtains a set of ID and Password, as in step 401. The Private Cloud Server 108 logs in to the Intermediate Routing Server 112, as in step 402.

Before the Smart Device Client 109 is able to access the Private Cloud Server 108, a number of steps have to happen. First, the Smart Device Client 109 obtains the ID and Password of the Private Cloud Server 108 from the server through a secure channel, such as phone call, email, text message or snail mail, as in step 403. The Smart Device Client 109 then logs in to the Intermediate Routing Server 112 with its own ID and the obtained ID and Password of the Private Cloud Server 108, as in step 404. All communication between the Smart Device Client 109 and the Private Cloud Server 108 are intercepted and encapsulated by the Intermediate Routing Server 112, as in step 405. Finally, the Smart Device Client 109 can start accessing the Private Cloud Server 108, as in step 406.

As opposed to the conventional approach shown in FIG. 2, the Intermediate Routing Server approach benefits from doing away with the router configuration. It therefore makes the setup much easier for the user. But it suffers the same, if not more serious business concerns on the issue of having to have all communication going through a public cloud based routing server.

Being a public cloud based server, the Intermediate Routing Server 112 creates a number of concerns to the Smart Device Client 109 owner. First, the sense of trust is always in question, because the Intermediate Routing Server 112 is a middleman during all communication transactions between the Smart Device Client 109 and the Private Cloud Server 108. It may hold all user account information, password and their corresponding IP addresses of the Smart Device Client 109 and the Private Cloud Server 108. The Intermediate Routing Server 112 is able to sniff any communication in-between and render it insecure.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

Figure 5:
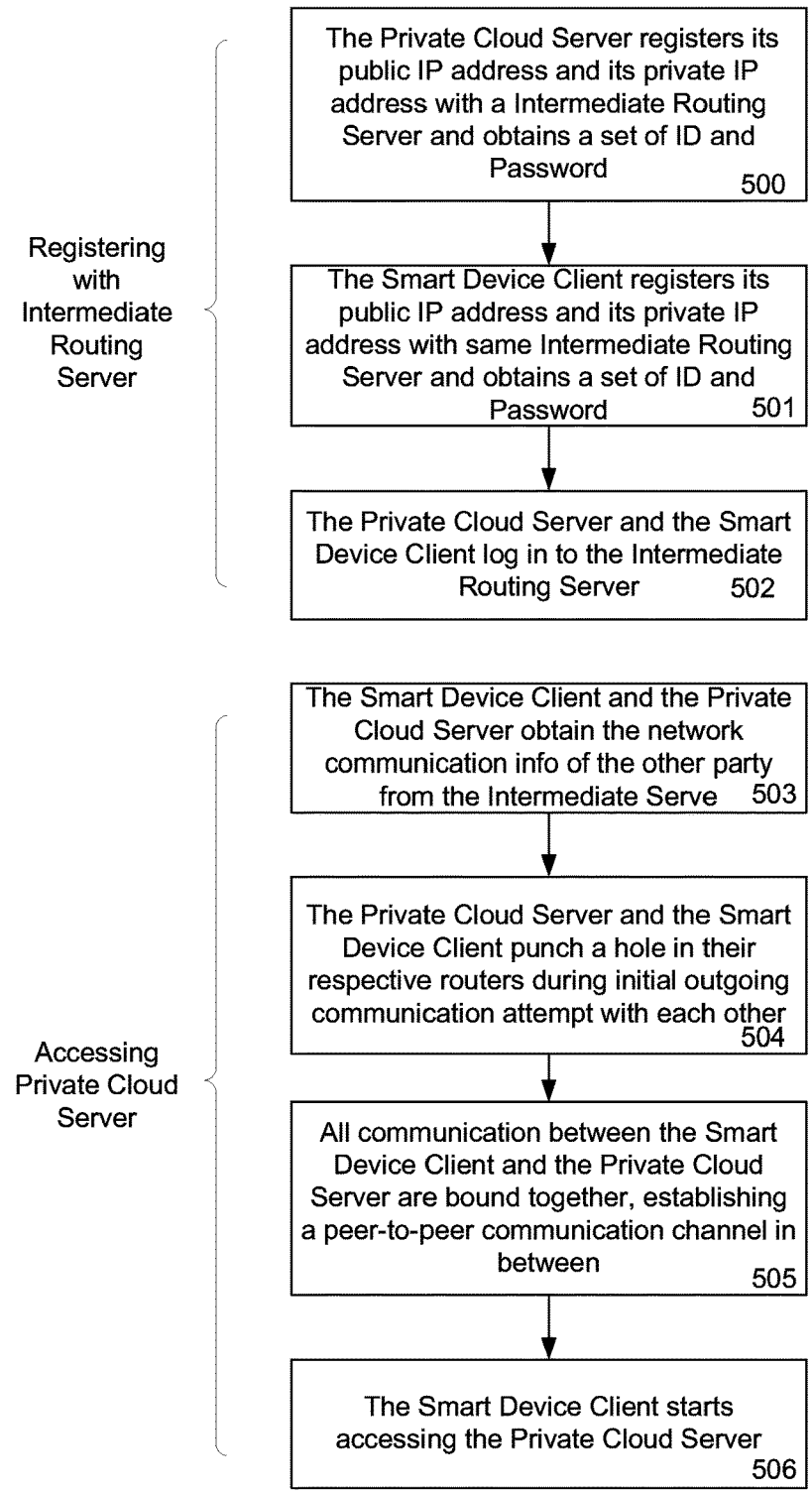
FIG. 5 shows a conventional implementation of how the Private Cloud Server can be accessed logically through peer-to-peer communication registering with an Intermediate Routing Server.

FIG. 5 shows an implementation of how the Private Cloud Server 108 can be accessed logically through peer-to-peer communication registering with an Intermediate Routing Server 112. The Private Cloud Server 108 first registers its public IP address and its private IP address with an Intermediate Routing Server 112 and obtains a set of ID and Password from the server, in step 500. The Smart Device Client 109 then registers its public IP address and its private IP address with the same Intermediate Routing Server 112 and obtains a set of ID and Password, as in step 501. The Private Cloud Server 108 and the Smart Device Client 109 log in to the Intermediate Routing Server 112, as in step 502.

Before the Smart Device Client 109 is able to access the Private Cloud Server 108, a number of steps have to happen. First, the Smart Device Client 109 and the Private Cloud Server 108 obtain the public IP and private IP addresses of the other party from the Intermediate Routing Server, as in step 503. Both parties punch a hole in their respective routers during initial outgoing communication attempt with each other, as in step 504. All communication between the Smart Device Client 109 and the Private Cloud Server 108 are bound together, establishing a peer-to-peer communication channel in between, as in step 505. Finally, the Smart Device Client 109 can start accessing the Private Cloud Server 108, as in step 506.

As opposed to the conventional approaches of FIG. 2, FIG. 3 and FIG. 4, the Intermediate Routing Server approach of this embodiment has the benefit of establishing peer-to-peer communication between the client and the server and offers better performance. But it still suffers from the problem of "single point of failure" where all communication go through a single public cloud based routing server. Being a public cloud based server, the Intermediate Routing Server 112 creates a number of concerns to the Smart Device Client 109 owner. First, the sense of trust is always in question, because the Intermediate Routing Server 112 is a middleman holding all user account information, password and their corresponding IP addresses of the Smart Device Client 109 and the Private Cloud Server 108.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

One of the biggest advantages of a system and method in accordance with the present invention over the above cited conventional approaches is to eliminate with the role of the public cloud based routing server during access, as in the case of either the VPN Routing Server or the Intermediate Routing Server. Another advantage of the invention is that no secret information such as password of the account is ever exchanged between the Smart Device Client 109 and the Private Cloud Server 108.

Figure 1B:
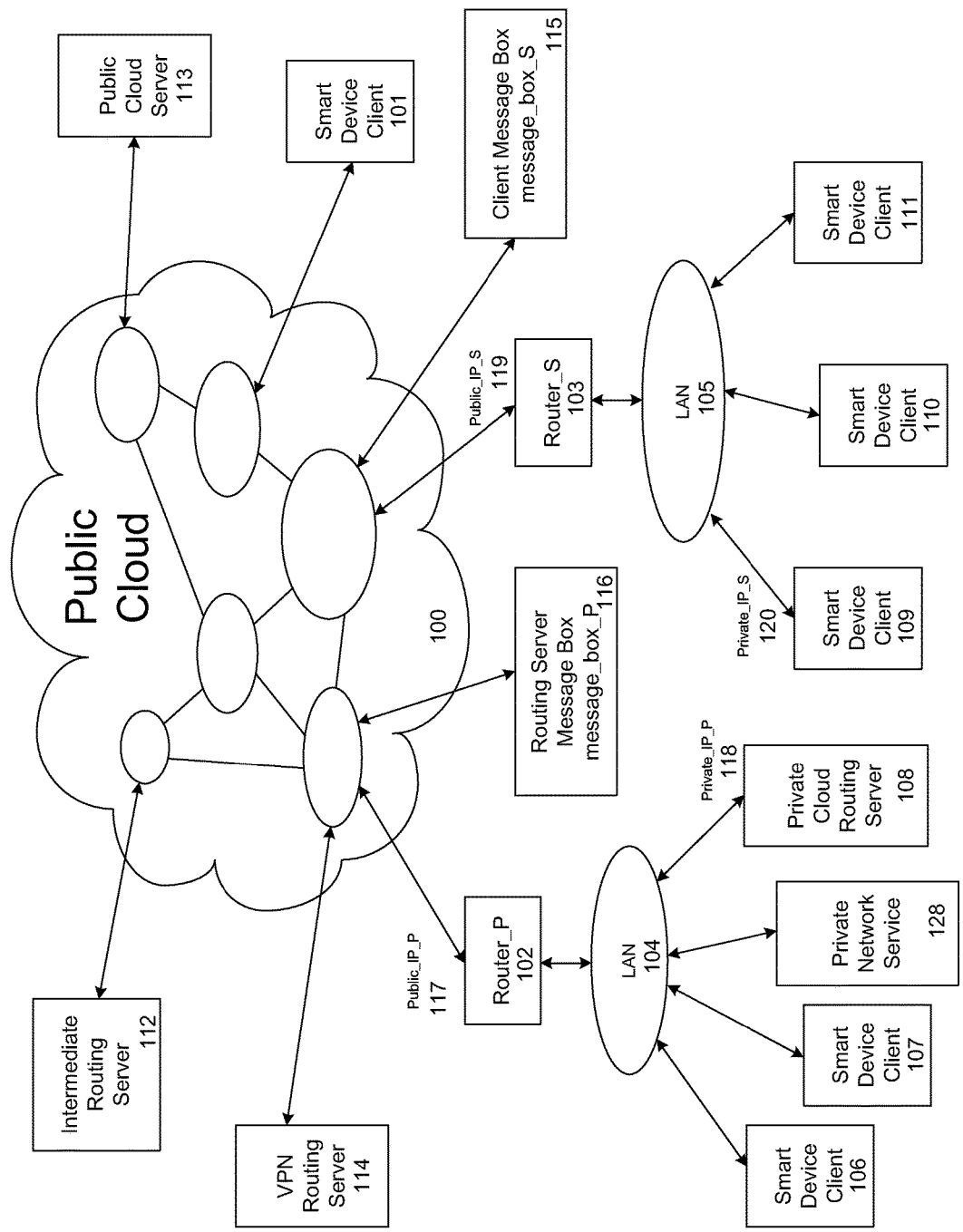
FIG. 1B is a block diagram of a Cloud Network Infrastructure in accordance with an embodiment.

FIG. 1B is a block diagram of a Cloud Network Infrastructure in accordance with an embodiment. Those elements that are the same as those described with respect to FIG. 1A have the same designators. However, in this embodiment, there are also two message boxes, Client Message Box message_box_S 115 and Routing Server Message Box message_box_P 116 which purposes will be described in detail hereinafter.

As in FIG. 1A, behind the LAN 104, there are Smart Device Clients 106, 107, a Private Cloud Server Routing Server (PCRS) 108 and a Private Network Service (PNS) 128. The original Private Cloud Server (PCS) 108 in FIG. 1A has been changed to a Private Cloud Routing Server (PCRS) 108 and a Private Network Service 128 (PNS) in FIG. 1B. Behind the LAN 105, there are Smart Device Clients 109, 110 and 111. The Smart Device Client can be a PC, notebook, tablet, eBook reader, GPS, smart TV, set top box, MP3 player, or any networkable embedded device. They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Figure 6:
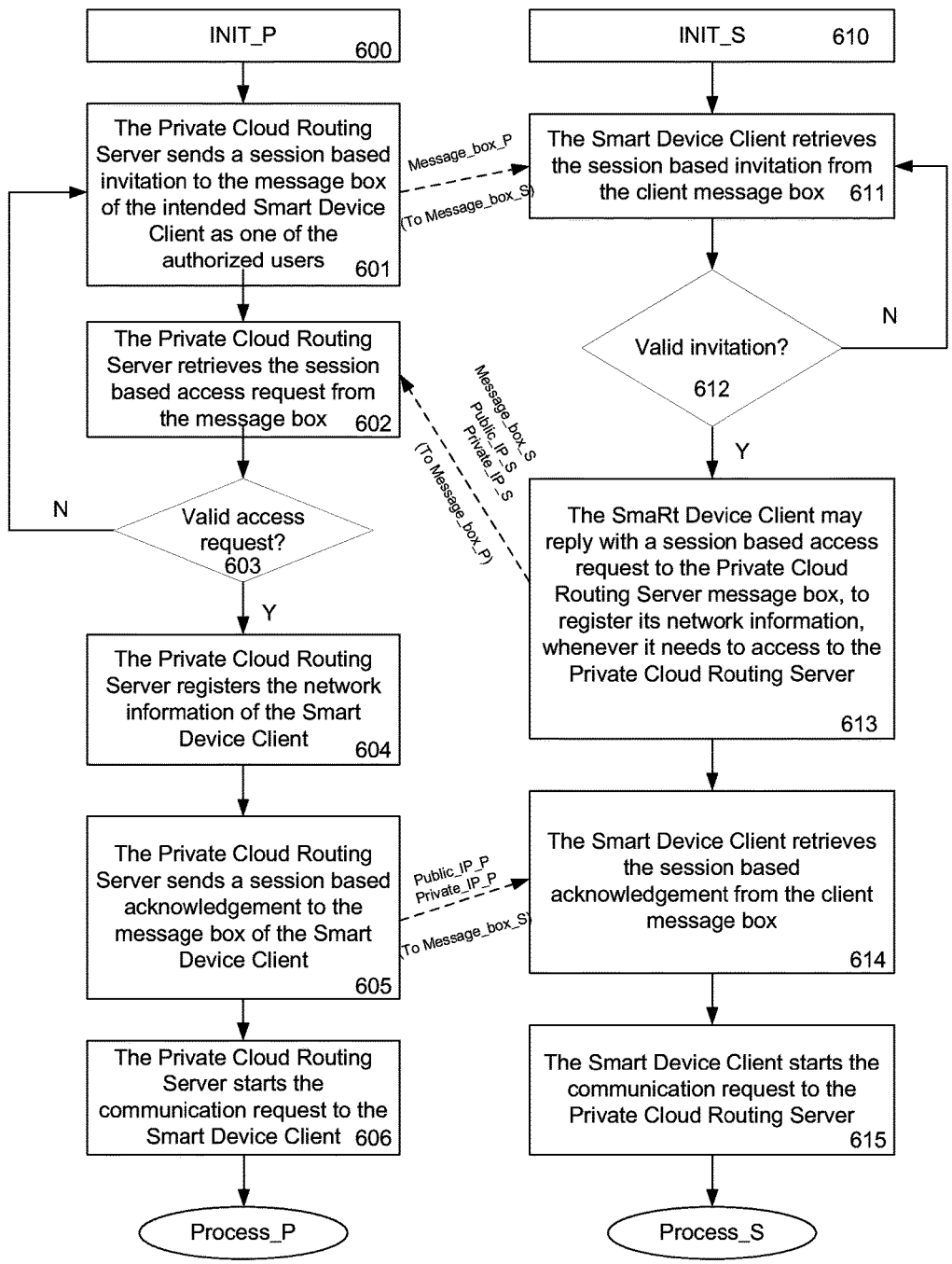
FIG. 6 illustrates an Initial Setup of the Private Cloud Server Routing Server and the Smart Device Client in accordance with the present invention.
Figure 7:
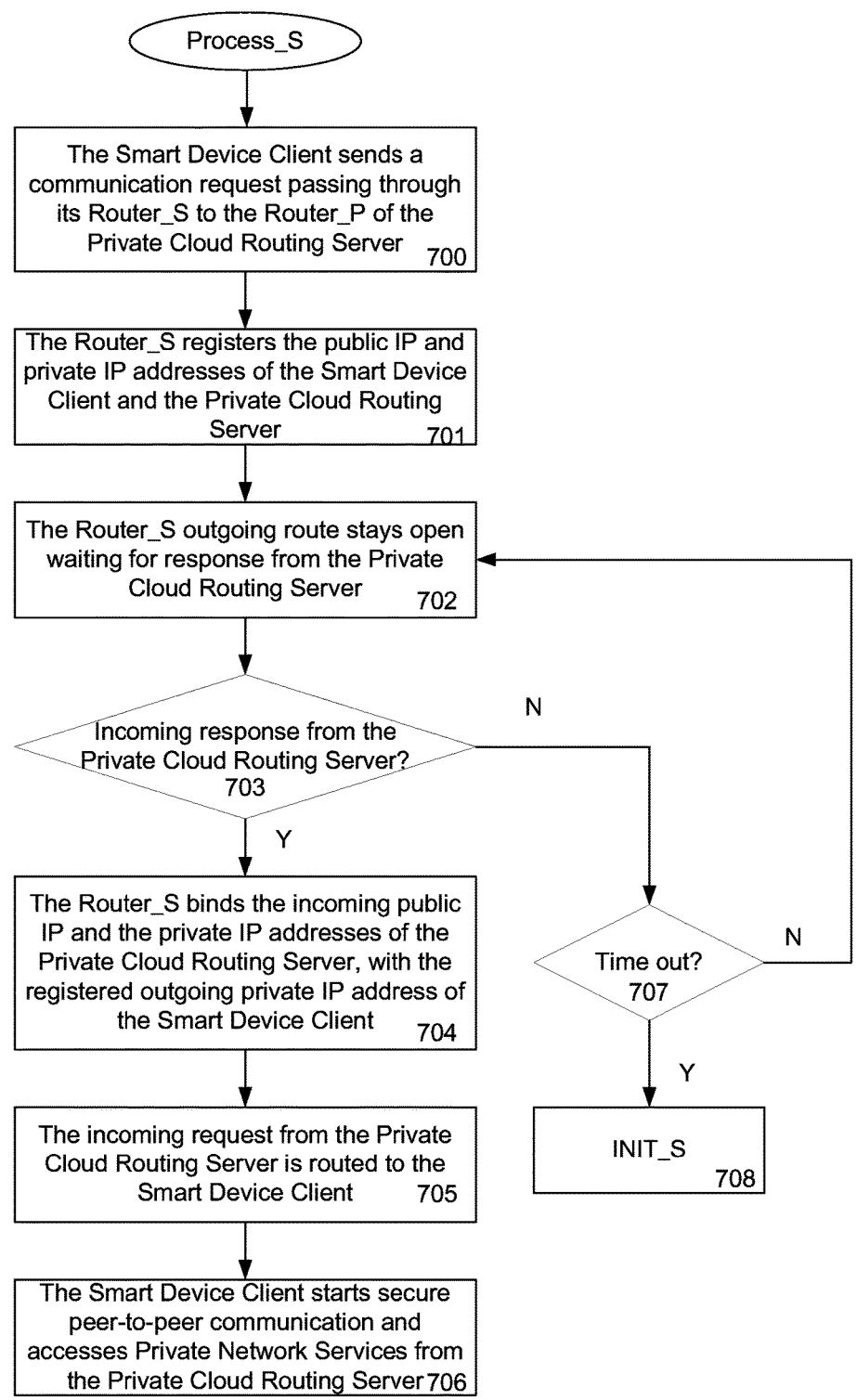
FIG. 7 shows the communication flow of the Smart Device Client in accordance with the present invention.
Figure 8:
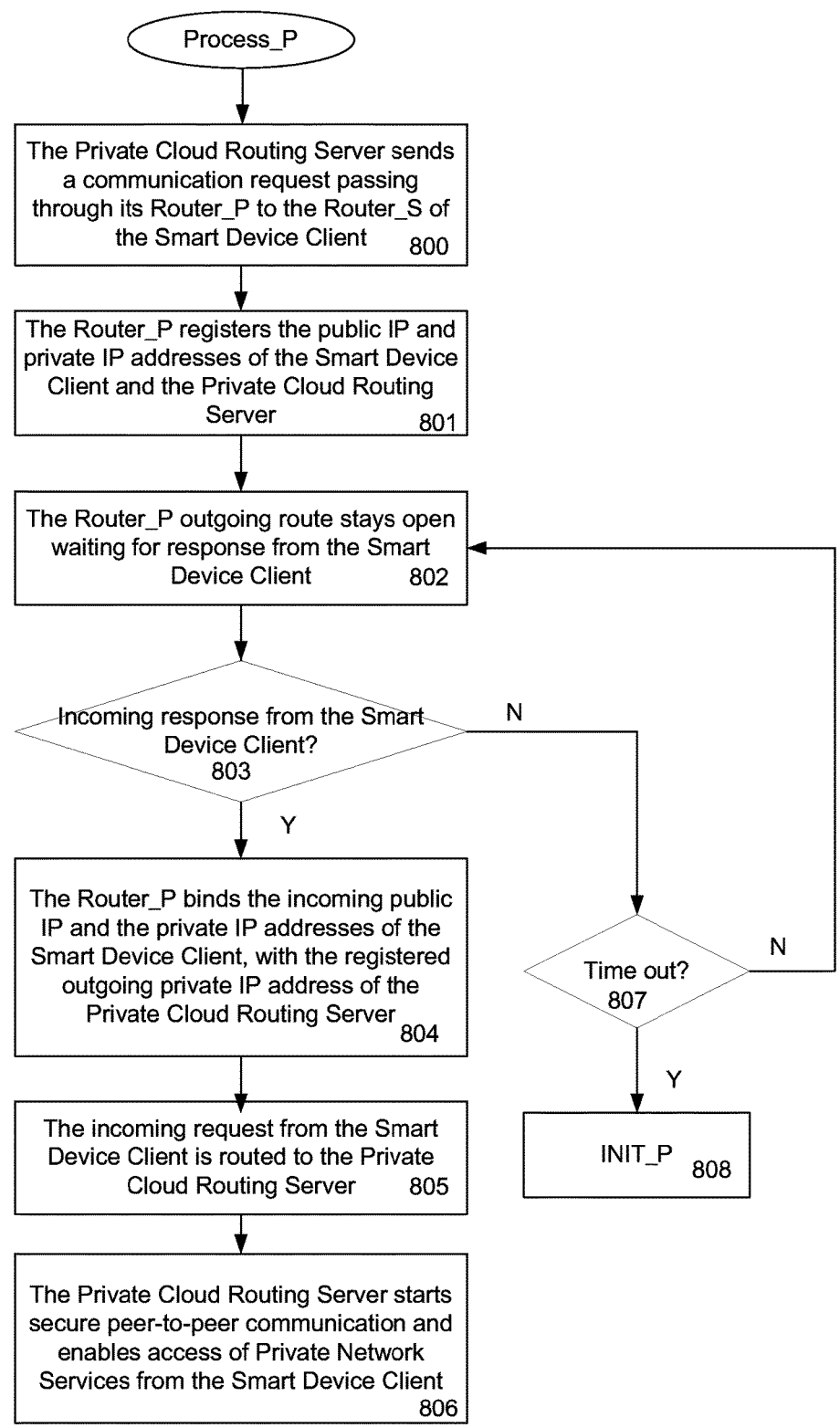
FIG. 8 shows the communication flow of the Private Cloud Routing Server in accordance with the present invention.

To describe the features of the present invention in more detail, refer now to FIG. 6, FIG. 7 and FIG. 8, which cover the initial setup phase and the access phase of the invention.

FIG. 6 illustrates an Initial Setup of the Private Cloud Routing Server 108 and the Smart Device Client 109 in accordance with the present invention. The Private Cloud Routing Server 108 and the Smart Device Client 109 form a server-client relationship. The Private Cloud Routing Server 108 first creates an authorized client list with the client account name and the corresponding message box information. The message box information can be in the form of an email account, text message account or other unique public account information of the client.

On the Private Cloud Routing Server 108 side, it sends a session based invitation to message_box_S 115 of the intended Smart Device Client 109 as one of the authorized users, in step 601. The session based invitation may include the routing server message box address message_box_P 116. The Private Cloud Routing Server 108 then attempts to retrieve session based access request that includes the client message box address message_box_S 115, client public IP Public_IP_S119 and private IP private_IP_S120 addresses from the routing server message box message_box_P 116, as in step 602.

If the access request is invalid, then it loops back to step 601. If the access request is valid, the Private Cloud Routing Server 108 then registers the client message box 115, public IP 119 and the private IP 120 addresses of the Smart Device Client 109, as in step 604. The Private Cloud Routing Server 108 sends to the client message box message_box_S 115, a session based acknowledgement with its current routing server public IP and private IP addresses, public_IP_P 117 and private_IP_P 118, as in step 605. The Private Cloud Routing Server 108 can start the communication request to the Smart Device Client 109, as in step 606.

On the Smart Device Client 109 side, it first retrieves the session based invitation from its own message_box_S 115, as in step 611. The session based invitation includes the message box address message_box_P 116 of the Private Cloud Routing Server. If the invitation from the Private Cloud Routing Server 108 is invalid, then it loops back to step 611. If the invitation is valid from the Private Cloud Routing Server 108, the Smart Device Client 109 may reply to the Private Cloud Routing Server 108 message box message_box_P 116 with a session based access request, to register its current client message box address, public IP and private IP addresses whenever it needs to access to the Private Cloud Routing Server 108, as in step 613. The session based access request may include the Smart Device Client 109 message box address, message_box_S 115, and the client public and private IP addresses, public_IP_S 119 and private_IP_S 120. The Smart Device Client 109 then retrieves from the client message_box_S 115, the session based acknowledgement with the Private Cloud Routing Server current public IP and private IP addresses, public_IP_P 117 and private_IP_P 118, as in step 614. The Smart Device Client 109 can start the communication request to the Private Cloud Routing Server, as in step 615. These two independent processes conclude the initial setup of the Private Cloud Routing Server 108 and the Smart Device Client 109.

The message box servers, hosting either server or client message boxes, can be an email server, text message server, or any kind of server that can host secure message for information exchange between the Private Cloud Routing Server 108, as a server, and the Smart Device Client 109, as a client. The security and business model of the message box server is well understood and expected in the industry by the user. For any reason the message box server is down, it can be replaced or redeployed immediately without jeopardizing the communication between the server and the client in the private cloud infrastructure.

FIG. 7 shows the communication flow of the Smart Device Client 109 in accordance with the present invention. The Smart Device Client 109 can start peer-to-peer communication with the Private Cloud Routing Server 108 without going through an Intermediate Routing Server 112 or a VPN Routing Server 114. The Smart Device Client 109 first sends a communication request passing through its Router_S 103 to the Router_P 102 of the Private Cloud Routing Server 108, as in step 700. The Router_S 103 registers the public IP and private IP addresses of the Smart Device Client 109 and the Private Cloud Routing Server 108, as in step 701. The Router_S 103 outgoing route stays open, punching a hole and waiting for response from the Private Cloud Routing Server 108, as in step 702. The Router_S 103 then checks if the incoming response is from the Private Cloud Routing Server 108, as in step 703. If the incoming response is invalid and it has timed out, then the initialization process of the Smart Device Client 109 starts over again, as in step 708. If it has not timed out, then it loops back to step 702. But, if the incoming response is valid, the Router_S 103 will bind the incoming public IP address and the private IP address of the Private Cloud Routing Server 108, with the registered outgoing private IP address of the Smart Device Client 109, as in step 704. The incoming request from the Private Cloud Routing Server 108 is then routed to the Smart Device Client 109, as in step 705. The Smart Device Client 109 can start secure peer-to-peer communication with the Private Cloud Routing Server 108 and access services from it, as in step 706.

FIG. 8 shows the communication flow of the Private Cloud Routing Server 108 in accordance with the present invention. The Private Cloud Routing Server 108 can start peer-to-peer communication with the Smart Device Client 109 without going through an Intermediate Routing Server 112 or a VPN Routing Server 114. The Private Cloud Routing Server 108 first sends a communication request passing through its Router_P 102 to the Router_S 103 of the Smart Device Client 109, as in step 800. The Router_P 102, in response to the outgoing communication request, then registers the public IP and private IP addresses of the Smart Device Client 109 and the Private Cloud Routing Server 108, as in step 801. The Router_P 102 outgoing route stays open, punching a hole and waiting for response from the Smart Device Client 109, as in step 802. The Router_P 102 checks for incoming response to see if it is from the Smart Device Client 109, as in step 803. If the incoming response is invalid and it has timed out, then the initialization process of the Private Cloud Routing Server 108 starts over again, as in step 808. If it has not timed out, then it loops back to step 802. But, if the incoming response is valid, the Router_P 102 will bind the incoming public IP address and the private IP address of the Smart Device Client 109, with the registered outgoing private IP address of the Private Cloud Routing Server 108, as in step 804. The incoming request from the Smart Device Client 109 is then routed to the Private Cloud Routing Server 108. The Private Cloud Routing Server 108 can start secure peer-to-peer communication with the Smart Device Client 109 and accept access of services from it, as in step 806.

In order to ensure the peer-to-peer communication channel secure, a number of security measures are deployed, including AES encryption and/or SSL (secure socket layer), TLS (transport layer security). The session based communication between the server and client, including invitation, access request and acknowledgement, also utilizes random number seeds, time stamp, encryption and hashing to defeat man-in-the middle and reply attack from the public cloud based to ensure the security and integrity of the communication.

Because the invention does not rely on a public cloud based routing server, it solves and eases a number of concerns to the Smart Device Client owner. First, there is no single point of failure between the client and the server. Second, there is no middleman during any communication transactions between the Smart Device Client 109 and the Private Cloud Routing Server 108. The performance is therefore better. Third, no sniffing of any communication in-between is possible and therefore makes the process very secure for the client and server. The user account information, password and their corresponding IP addresses of the Smart Device Client 109 and the Private Cloud Routing Server 108 are never exposed to a public cloud based. The only outside communication channels utilized in information exchange between the Smart Device Client 109 and the Private Cloud Routing Server 108 are the two private message boxes message_box_S 115 and message_box_P 116. The password information is never exchanged between the Private Cloud Routing Server 108 and the Smart Device Client 109, as a client. The security of the communication is as good as the message box servers hosting message_box_S 115 and message_box_P 116. If for any reason either message box is compromised or out of service, another replacement or backup message box can be deployed immediately. In this invention, any key component, including router, network switch, message box, Smart Device Client 109, or even Private Cloud Routing Server 108, can be replaced without affecting the efficiency and integrity of the communication link between the Smart Device Client 109 and the Private Cloud Routing Server 108.

Figure 9:
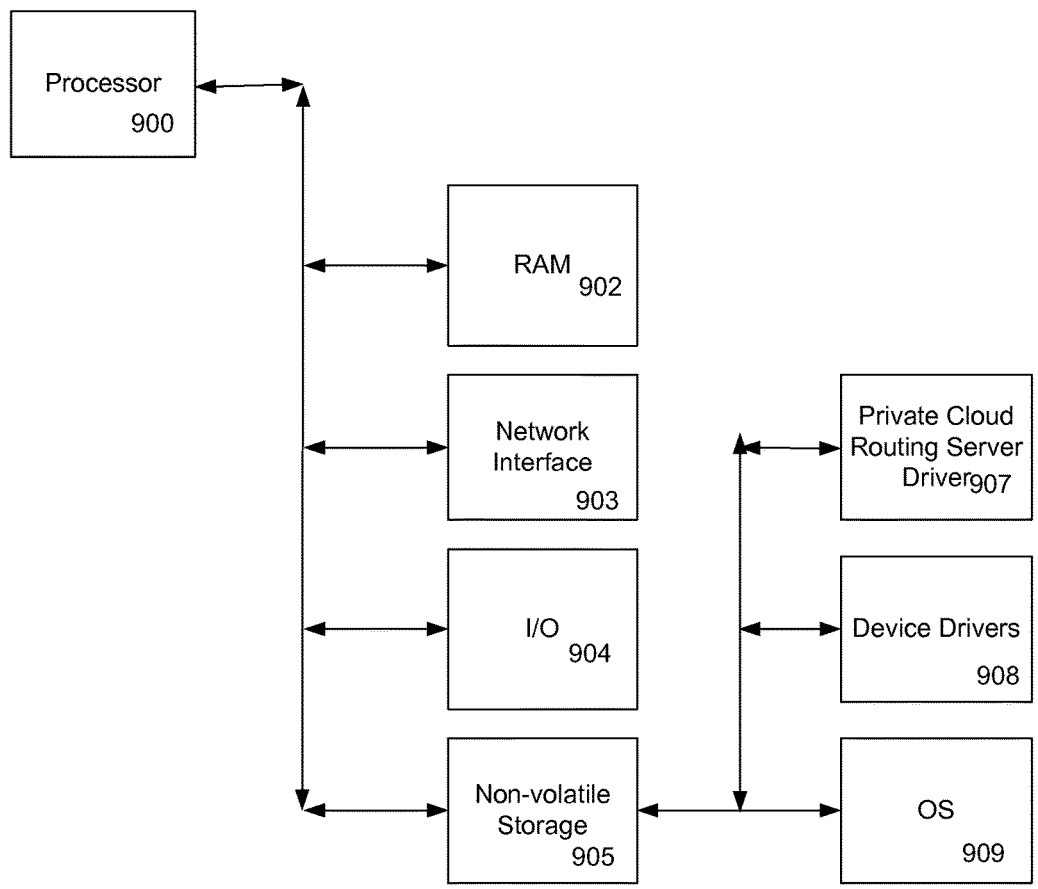
FIG. 9 shows a block diagram of the Private Cloud Routing Server in accordance with the present invention.

FIG. 9 shows a block diagram of the Private Cloud Routing Server 108 in accordance with the present invention. It includes a processor 900, RAM 902, network interface 903, input/output (I/O) 904, and non-volatile storage 905. The non-volatile storage 905 further contains an operating system (OS) 909, device driver 908, and private cloud routing server driver 907.

The network interface 903 can connect to LAN, WAN or 3G/4G network. The I/O 904 is for user interface to the outside world, including input/output devices such as keyboard, mouse, audio and video. The non-volatile storage 905 is loaded with necessary software including OS and various device drivers.

The Private Cloud Routing Server Driver 907 is deployed to communicate with the corresponding Private Cloud Client Driver from the Smart Device Client 109. The Private Cloud Routing Server Driver 907 initiates invitation, processes the access request, and then sends acknowledgement back to the Smart Device Client 109. Later, it sends communication request to the Smart Device Client 109 and opens a hole in its router in the outgoing direction. Once the incoming request from the Smart Device Client reaches the opened hole, the two-way communication channel is bound together. The Private Cloud Routing Server Driver 907 can start secure peer-to-peer communication with the Smart Device Client 109.

Figure 10:
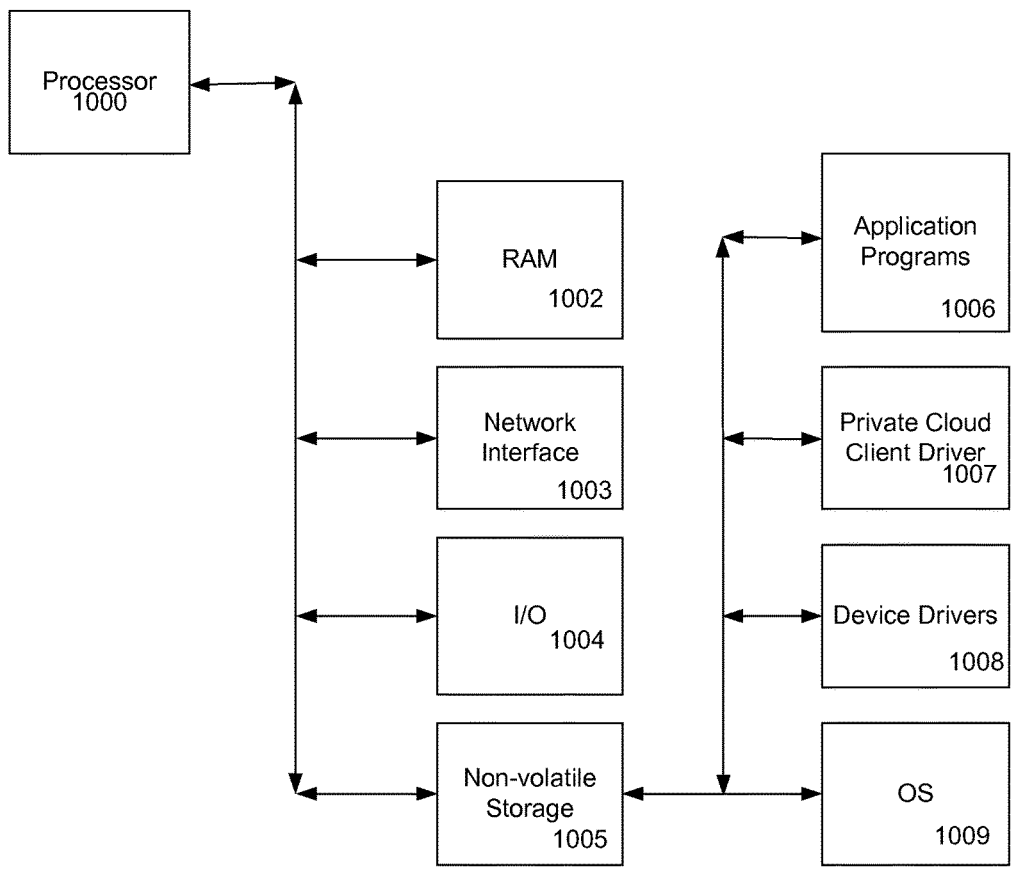
FIG. 10 shows a block diagram of the Smart Device Client in accordance with the present invention.

FIG. 10 shows a block diagram of the Smart Device Client 109 in accordance with the present invention. The Smart Device Client 109 includes a processor 1000, RAM 1002, network interface 1003, input/output (I/O) 1004, and non-volatile storage 1005. The non-volatile storage 1005 further contains an operating system (OS) 1009, device driver 1008, and Private Cloud Client Driver 1007. The Smart Device Client 109 will also be loaded with Application Programs 1006 to communicate with the Private Cloud Routing Server 108. The network interface 1003 can connect to LAN, WAN or 3G/4G network.

The I/O 1004 is for user interface to the outside world, including input/output devices such as touch pad, audio and video. The non-volatile storage can be hard disk storage or flash based solid state disk. Inside the non-volatile storage 1005, it is loaded with necessary software including OS and device drivers. The Private Cloud Client Driver 1007 is deployed to communicate with the corresponding Private Cloud Routing Server Driver 907 from the Private Cloud Routing Server 108. The Private Cloud Client Driver 1007 responds to server invitation, replies with the access request, and then accepts acknowledgement from the Private Cloud Routing Server 108. Later, it sends communication request to the Private Cloud Routing Server 108 and opens a hole in its router in the outgoing direction.

Once the incoming request from the Private Cloud Routing Server 108 reaches the opened hole, the two-way communication channel is bound together. The Smart Device Client 109 can start secure peer-to-peer communication with the Private Cloud Routing Server 108. The Private Network Service 128 is then manageable or accessible by the Smart Device Client through the Public Cloud 100. The wording or access or accessible covers the meaning of manage or manageable throughout the text.

For performance consideration, the Private Cloud Routing Server 108 and the corresponding router Router_P 102 can be one entity in certain environment. In either case, any reachable Private Network Services by the Private Cloud Routing Server 108 is accessible by the Smart Device Client through the Public Cloud 100.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for use with a public cloud network that includes a private cloud routing server, a private router, a private network service, and a smart device client, the method comprising:
   processing an initial setup of a private cloud routing server and a smart device client in a client server relationship, wherein the private cloud routing server is associated with a server message box located on a public cloud network separate from the private cloud routing server, and wherein the smart device client is associated with a client message box located on the public cloud network separate from the smart device client, the initial setup including:
      sending, by the private cloud routing server, a session based invitation to the client message box of the smart device client,
      retrieving, by the smart device client, the session based invitation of the private cloud routing server from the client message box of the smart device client,
      validating, by the smart device client, the session based invitation,
      in response to validating the session based invitation, transmitting, by the smart device client, a session based access request that includes a public IP address and a private IP address of the smart device client to the server message box of the private cloud routing server,
      retrieving, by the private cloud routing server, the session based access request of the smart device client from the server message box,
      validating, by the private cloud routine server, the session based access request;
      in response to the validating the session based access request, registering, by the private cloud routing server, the public IP address and the private IP address of the smart device client to allow access to the private cloud routing server by the smart device client,
      sending, by the private cloud routing server, a session based acknowledgment with a public IP address and a private IP address of the private cloud routing server to the client message box of the smart device client, and
      enabling the smart device client to securely access a private network service via the public cloud network after registration of the public and private IP address of the private cloud routing server; and
   connecting the private cloud routing server and smart device client by at least one connection of:
      in response to the private IP address of the private cloud routing server being in a same first Local Area Network (LAN) as the smart device client, the smart device client directly connects to the private cloud routing server using the private IP address of the private cloud routing server, and
      in response to the private IP address of the private cloud routine server not being in the same first LAN as the smart device client, the smart device client connects through a first WAN to the public cloud network using the public IP address of the private cloud routine server.

2. The method of claim 1, further comprising:
   creating and managing, by the private cloud routing server, an authorized client list including corresponding message box information of a plurality of smart device clients.

3. The method of claim 2, wherein the initial setup further includes:
   sending a communication request to the smart device client;
   punching a hole in the router to stay open for a pending smart device client response;
   waiting for the router to bind the network connection between the smart device client and the private cloud routing server;
   routing incoming request from the smart device client to the private cloud routing server;
   establishing a secure peer-to-peer communication with the smart device client; and
   enabling access of the private network service from the smart device client.

4. The method of claim 2, wherein the initial setup further includes:
   retrieving the session based invitation from the device message box;
   retrieving the session based acknowledgement from the client message box;
   sending a communication request to the private cloud routing server;
   punching a hole in a router to stay open pending the private cloud routing server response;
   waiting for the router to bind a network connection through the router to a network between the private cloud routing server and the smart device client;
   routing an incoming request from the private cloud routing server to the smart device client;
   establishing a secure peer-to-peer communication with the private cloud routing server; and
   accessing the private network service through the private cloud routing server.

5. The method of claim 4, wherein the initial setup further includes:
   accessing the private cloud routing server;
   accessing the private cloud routing server behind a firewall with fixed or dynamic IP addresses, wherein the smart device client requires no outside or public cloud based routing server in a wide area network (WAN), requires no additional router setup in a local area network (LAN), and establishes a secure peer-to-peer communication channel with the private cloud routing server; and
   accessing the private network service through the private cloud routing server.

6. The method of claim 4, wherein the initial setup further includes:
   accessing the private cloud routing server;
   accessing the private cloud routing server behind a firewall with fixed or dynamic IP addresses, wherein the smart device client requires no outside or public cloud based routing server in a wide area network (WAN), requires no additional router setup in a local area network (LAN), and establishes a secure peer-to-peer communication channel with the private cloud routing server;

mapping a local physical I/O to a virtual private cloud routing server I/O; and accessing the private network service through the private cloud routing server.

7. The method of claim 2, wherein the initial setup further includes:

retrieving the session based invitation from the client message box;

sending a session based reply to the server message box;

retrieving the session based acknowledgement from the client message box;

waiting for a private cloud routing server response;

binding a network connection to a network between the private cloud routing server and the smart device client;

routing an incoming request from the private cloud routing server to the smart device client;

establishing a secure peer-to-peer communication with the private cloud routing server; and accessing the private network service through the private cloud routing server.

8. The method of claim 7 wherein the initial setup further includes:

accessing the private cloud routing server;

accessing the private cloud routing server behind a firewall with fixed or dynamic IP addresses, wherein the smart device client requires no outside or public cloud based routing server in a wide area network (WAN), requires no additional router setup in a local area network (LAN), and establishes a secure peer-to-peer communication with the server; and accessing the private network service through the private cloud routing server.

9. The method of claim 7, wherein the initial setup further includes:

accessing the private cloud routing server;

accessing the private cloud routing server behind a firewall with fixed or dynamic IP addresses, wherein the smart device client requires no outside or public cloud based routing server in a wide area network (WAN), requires no additional router setup in a local area network (LAN), and establishes a secure peer-to-peer communication with the server;

mapping a local physical I/O to a virtual server I/O; and accessing the private network service through the private cloud routing server.

10. A private cloud routing server, comprising:

a computing device;

a network connection through a router to a network; and a program when executed by the computing device enables the private cloud routing server to:

create and manage an authorized client list to accommodate a plurality of smart device clients;

send a session based invitation to a client message box of a smart device client of the plurality of smart device clients;

retrieve a session based access request of the smart device client from a server message box, wherein a public IP address and a private IP address of both the private cloud routing server and the smart device client is registered;

send a session based acknowledgement to the client message box of the smart device client, wherein the session based acknowledgment includes a current public IP address and a current private IP address of the private cloud routing server; and enable access of private network services from the smart device client; and connect the private cloud routing server and smart device client by at least one connection of:

in response to the private IP address of the private cloud routine server being in a same first Local Area Network (LAN) as the smart device client, the smart device client directly connects to the private cloud routine server using the private IP address of the private cloud routine server, and in response to the private IP address of the private cloud routine server not being in the same first LAN as the smart device client, the smart device client connects through a first WAN to the public cloud network using the public IP address of the private cloud routing server.

11. A smart device client, comprising:

a computing device; and a network connection through a router to a network, wherein the router has a program that in response to execution by the computing device enables the smart device client to:

retrieve a session based invitation from a smart device client message box;

send a session based access request to a private cloud routing server message box, wherein a public IP address and a private IP address of both a private cloud routing server and the smart device client is registered;

retrieve a session based acknowledgement from the smart device client message box, wherein the session based acknowledgment includes a current public IP address and a current private IP address of the private cloud routing server;

send a communication request to the private cloud routing server;

punch a hole in the router to stay open pending a private cloud routing server response;

wait for the router to bind the network connection between the private cloud routing server and the smart device client;

route an incoming request from the private cloud routing server to the smart device client;

establish a secure peer-to-peer communication with the private cloud routing server;

access a private network service through the private cloud routing server; and connect the private cloud routing server and smart device client by at least one connection of:

in response to the private IP address of the private cloud routing server being in a same first Local Area Network (LAN) as the smart device client, the smart device client directly connects to the private cloud routing server using the private IP address of the private cloud routine server, and in response to the private IP address of the private cloud routine server not being in the same first LAN as the smart device client, the smart device client connects through a first WAN to the public cloud network using the public IP address of the private cloud routing server.

* * * * *